Sept. 6, 1938.      A. J. E. GEAIRNS      2,129,320
PIPE SUPPORT
Filed Sept. 18, 1937
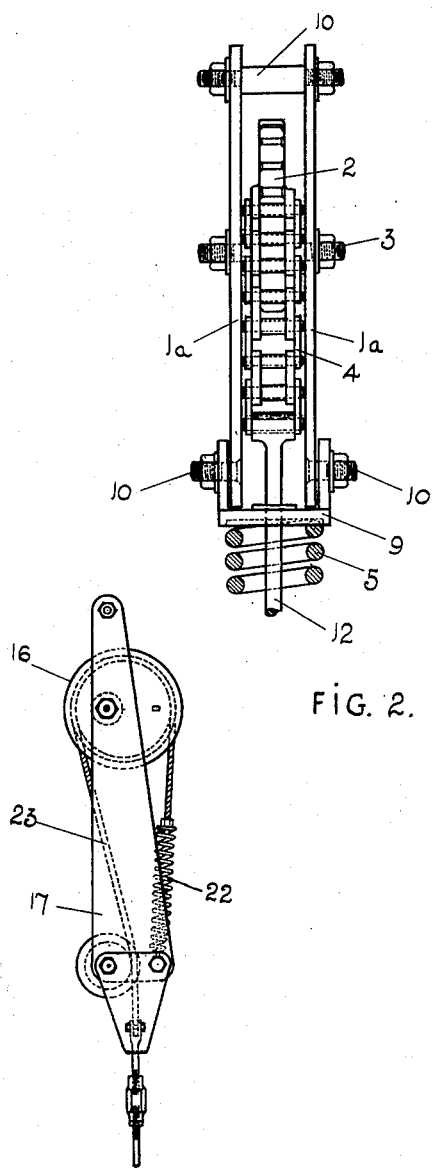
FIG. 2.
FIG. 3.
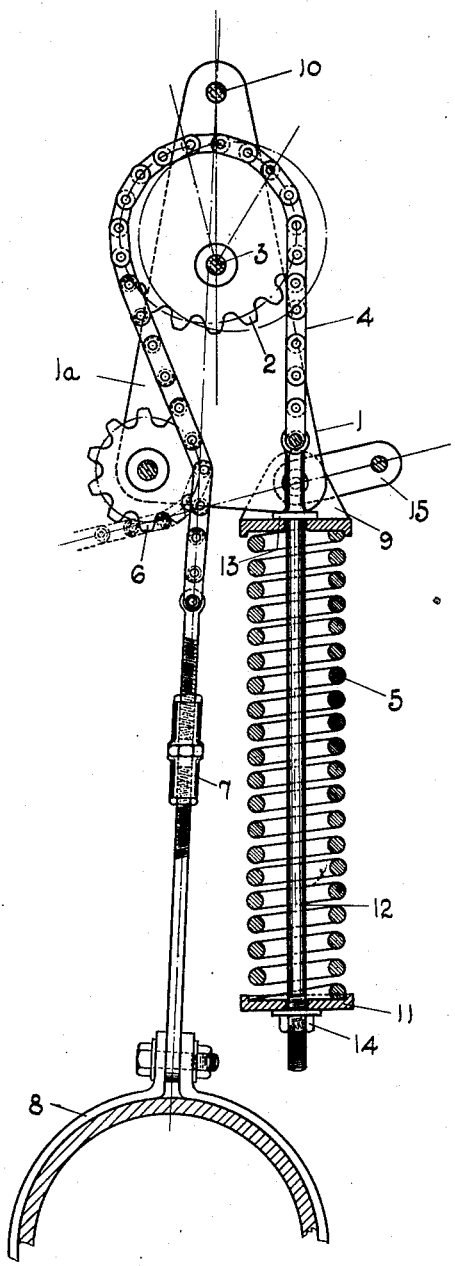
FIG. 1.
A. J. E. Geairns
Inventor
By C. A. Snow & Co.
Attorneys.

Patented Sept. 6, 1938

2,129,320

UNITED STATES PATENT OFFICE 2,129,320

PIPE SUPPORT

Alexander James Ernest Geairns, Wolverhampton, England

Application September 18, 1937, Serial No. 164,592
In Great Britain October 2, 1936

4 Claims. (Cl. 248—54)

This invention relates to a device for flexibly supporting a pipe line, in order to provide for vertical or other movements caused by expansion or contraction of the pipe line due to variations in temperature; and the present invention has for its object a simple method of ensuring that there will be an even tension on the pipe line supports, so that there will be no detrimental variation in the tension through a predetermined range of movement of the pipe line.

According to the present invention, the device for flexibly supporting a pipe line comprises a chain wheel which forms a pulley or pivotally mounted member over which a flexible band or bands or chain or chains or the like is or are supported, a spring device exerting a pull on the flexible member or the like on one side of the pulley and balancing the pull of a pipe line support connected to the flexible member on the other side of the pulley, the shape of the pulley or pivotal member being such that the leverage of the pull of the flexible member connected to the pipe line support about the turning axis of the pulley increases as the tension or compression of the spring increases, whilst the leverage of the force of the spring about the turning axis of the pulley decreases with the increase of the force of the spring. The pulley or chain wheel may be circular and is mounted to pivot about an eccentrically arranged axis. The flexible member connected to the pipe line support or load to be supported passes over a guide or guide pulley or wheel so that the pipe line support is normally guided to have a true or substantially true vertical movement. The component parts may be mounted on a bracket to form a self contained unit which is adapted to be suspended from a support.

Referring to the drawing:—

Figure 1 is a sectional side elevation of a device construction according to this invention.

Figure 2 is an end elevation of a portion of the device, and

Figure 3 is a side elevation of a modified construction.

According to a convenient embodiment of this invention, the device comprises a bracket 1 formed of two side plates 1a connected together and distanced apart by means of bolts. A chain sprocket wheel or pulley 2 is located between the plates 1a and is rotatably mounted on the spindle 3. The periphery of the wheel 2 is circular and the axis of rotation is eccentric to the periphery. A chain 4 passes over the wheel 2 and is connected at one side of the wheel to a spring 5 and at the other side to a pipe line support 8 to hold such pipe line support in suspension. The spring 5 bears against an abutment fitting 9 pivoted on one of the pins 10 carried by the bracket 1, and the outer end of the spring bears on an abutment disc 11 slidable on the rod 12 connected to the chain 4, a collar 13 on the rod 12 bearing against the fitting 9. A guide wheel 6 is rotatably mounted between the plates 1a and the chain 4 passes over the wheel, so that the pipe line support is normally guided to have a movement in a vertical direction. A turn buckle 7 connects the chain 4 with the pipe line support member to provide for any required adjustment. The tension of the spring 5 is adjustable by means of the nut 14 to counteract the weight of the pipe line support. In this condition the moment of the load of the pipe line about the turning axis of the wheel 2 equals the moment of the force of the spring 5 about the axis of the wheel. Should any downward movement of the pipe line support take place the wheel 2 is rotated, by the travel of the chain thereover, and the spring 5 is compressed, thereby increasing the force of the spring. To counteract this, the leverage of the spring force about the turning axis of the wheel 2 is reduced whilst the leverage of the pipe line support load about the axis of the wheel 2 is increased. The eccentric wheel is positioned so that the variation in these leverages ensures that there is a substantially constant tension in the side of the chain connected to the pipe line support. Whilst the chain passes from the load side of the wheel 2 at variable distances from the axis of rotation of the wheel, no lateral stress on this account will be transmitted to the pipe line, as the flexible band passes over the guide wheel 6. The bracket 1 is adapted to be suspended through the medium of the bolt 10 thereby providing a simple means of fitting the device in position, whilst also permitting the device to align itself in the direction of the pull.

The bracket 1 can also be fixed to a supporting structure in a position at right angles to that shown by Figure 1, the bracket in such case being suspended by means of the link 15. In this case the chain 4 passes over the top of the guide wheel 6 and passes therefrom in line with the link 15 as shown in dotted lines.

The chain 4 may be of any other suitable construction and may for instance be of wire rope, or a flat flexible band of any suitable material. In some cases the flexible member 4, when formed as a wire rope, is anchored to a pulley which is substituted for the toothed wheel, or again the ends of two bands may be fixed to the pulley, one passing around the pulley in one direction to the spring and the other passing around the pulley in the other direction to the pipe line support. Any number of springs may be coupled together to give the required spring tension in accordance with the load to be supported. In lieu of the toothed wheel 2 or pulley being an eccentrically mounted circular member, it may be given a variable contour to balance the force moments, whilst retaining a constant tension on the side of the chain or flexible band connected to the pipe line support, when the pulley is rotated to permit of the movement of the pipe line support. In the form shown by Figure 3, a grooved pulley 16 is mounted on the bracket 17 and a cable 23 is connected to the tension spring 22.

When the device is in use, the spring device is tensioned to counteract the load on the pipe line support and $S \times D = L \times d$ where S is the spring load, D the leverage of the spring load about the turning axis of the wheel or pulley 2, L the load on the pipe line support and $d$ the leverage of the tension of the pipe line support about the turning axis of the wheel or pulley. By suitably designing the wheel or pulley, $S \times D = L \times d$, within a predetermined movement of the pipe line support. The range of movement in actual practice is of a limited nature and the wheel or pulley is designed to work between predetermined limits.

What I claim is:

1. A device for flexibly supporting a pipe line, comprising a pivotally mounted member forming a lever pivoted intermediate its ends, a flexible member passing therefrom on each side of the pivot axis and adapted to be respectively wound on and off each side of the pivotally mounted member when it is rotated, a spring device adapted to exert a pull on the flexible member on one side of the pivotally mounted member and adapted to balance the pull of a pipe line support on the flexible member passing from the other side of the pivotally mounted member, the shape of the pivotally mounted member on which the flexible member is supported being such that the leverage of the pull of the flexible member connected to the pipe line support about the turning axis of the pivotally mounted member increases as the force of the spring increases, whilst the leverage of the force of the spring about the turning axis of the pivotally mounted member decreases with the increase of the force of the spring.

2. A device for flexibly supporting a pipe line comprising a circular pulley which is mounted to rotate about an eccentric axis, a flexible member passing from each side of the pulley and adapted to be respectively wound on and off the pulley on each side when rotated, a spring device adapted to exert a pull on the flexible member passing from one side of the pulley and adapted to balance the pull of a pipe line support on the flexible member passing from the other side of the pulley, the periphery of the pulley in relation to the pivot axis being so arranged that the leverage of the pull on the flexible member connected to the pipe line support about the turning axis of the pulley increases as the force of the spring increases, whilst the leverage of the force of the spring about the turning axis of the pulley decreases with the increase of the force of the spring.

3. A device for flexibly supporting a pipe line support comprising a circular pulley which is mounted to rotate about an eccentric axis, a flexible member passing from each side of the pulley and adapted to be respectively wound on and off the pulley on each side when rotated, a spring device adapted to exert a pull on the flexible member passing from one side of the pulley and adapted to balance the pull of a pipe line support on the flexible member passing from the other side of the pulley, and a guide pulley over which the flexible member, on the side of the said pulley connected to the pipe line support, passes, so that the pipe line support will have a vertical movement, the periphery of the eccentrically mounted pulley in relation to the pivot axis being so arranged that the leverage of the pull of the flexible member connected to the pipe line support about the turning axis of the pulley increases as the force of the spring increases, whilst the leverage of the force of the spring about the turning axis of the pulley decreases with the increase of the force of the spring.

4. A device for flexibly supporting a pipe line support comprising a circular pulley which is mounted to rotate about an eccentric axis, a bracket, adapted to be suspended from a suitable support, on which the pulley is mounted, a flexible member passing from each side of the pulley and adapted to be respectively wound on and off the pulley on each side when rotated, a spring device mounted on said bracket adapted to exert a pull on the flexible member passing from one side of the pulley and adapted to balance the pull of a pipe line support on the flexible member passing from the other side of the pulley, and a gu'de pulley mounted on said bracket over which the flexible member, on the side of the said pulley connected to the pipe line support, passes, so that the pipe line support will have a vertical movement, the periphery of the eccentrically mounted pulley in relation to the pivot axis being so arranged that the leverage of the pull of the flexible member connected to the pipe line support about the turning axis of the pulley increases as the force of the spring increases, whilst the leverage of the force of the spring about the turning axis of the pulley decreases with the increase of the force of the spring.

ALEXANDER JAMES ERNEST GEAIRNS.